United States Patent [19]
Höhlein et al.

[11] Patent Number: 4,639,499
[45] Date of Patent: Jan. 27, 1987

[54] CROSS-LINKABLE POLYMER RESINS AND USE THEREOF AS BINDERS FOR COATING AGENTS

[75] Inventors: Peter Höhlein, Kempen; Manfred Schmidt, Dormagen; Josef Pedain; Bernd Riberi, both of Cologne; Michael Sonntag, Odenthal, all of Fed. Rep. of Germany

[73] Assignee: Bayer Aktiengesellschaft, Leverkusen, Fed. Rep. of Germany

[21] Appl. No.: 756,483

[22] Filed: Jul. 18, 1985

[30] Foreign Application Priority Data

Jul. 25, 1984 [DE] Fed. Rep. of Germany ....... 3427385

[51] Int. Cl.$^4$ .................... C08F 238/00; C08F 220/04
[52] U.S. Cl. .................... 526/285; 526/227; 526/317.1; 526/318; 526/318.2; 526/318.44; 526/318.6
[58] Field of Search ............ 526/285, 317.1, 227, 526/318, 318.2, 318.44, 318.6; 528/354, 392; 525/327.2, 328.1

[56] References Cited

U.S. PATENT DOCUMENTS

Re. 30,234  3/1980  Sampson et al. .............. 525/162
3,002,959  10/1961  Hicks ............................ 260/88.1
3,268,484  8/1966  Costanza et al. .............. 526/333 X
3,375,227  3/1968  Hicks ............................ 260/47
4,264,755  4/1981  Cross .............................. 526/332

FOREIGN PATENT DOCUMENTS 1038754  9/1958  Fed. Rep. of Germany.
2460329  1/1976  Fed. Rep. of Germany.
1515868  6/1978  United Kingdom.

Primary Examiner—Theodore E. Pertilla
Attorney, Agent, or Firm—Gene Harsh; Joseph C. Gil; Thomas W. Roy

[57] ABSTRACT

The present invention is directed to cross-linkable, hydroxyl group-containing polymer resins which are obtained by copolymerizing olefinically-unsaturated monomers and are suitable as binder components for lacquers, the polymer resins having a hydroxyl number of about 20 to 400, an average osmometrically-determined molecular weight of about 500 to 30,000 and a molecular inhomogeneity U of about 0.5 to 15, characterized in that they contain about 0.2 to 80% by weight, preferably about 10 to 70% by weight, based on the total weight of the copolymers, of incorporated monomers selected from olefinically- and acetylenically-unsaturated aliphatic diols having 4 carbon atoms, the ether group-containing alkoxylation products thereof with a hydroxyl number of about 50 to 900, the reaction products of these diols with ε-caprolactone in a mol ratio of diol:-caprolactone of about 1:0.2 to 1:10 and any mixtures of these components.

The present invention is also directed to the use of the above polymer resins as binders for coating compositions.

3 Claims, No Drawings

CROSS-LINKABLE POLYMER RESINS AND USE THEREOF AS BINDERS FOR COATING AGENTS

BACKGROUND OF THE INVENTION

1. Field of the Invention

This invention relates to novel cross-linkable, hydroxyl group-containing polymer resins which are produced by copolymerization from olefinically-unsaturated monomers with the simultaneous use of unsaturated C$_4$-diols or particular derivatives of such diols, and to the use of the polymer resins as binders for coating agents.

2. Description of the Prior Art

Hydroxyl group-containing polymer resins based on olefinically-unsaturated monomers and their use as binders for coating agents are described in a large number of publications (c.f. e.g. DE-OS No. 2,460,329, DE-AS No. 1,038,754, U.S. Pat. Nos. 3,002,959, 3,375,227, GB-PS No. 1,515,868).

These known hydroxyl group-containing polymer resins are particularly suitable in conjunction with organic polyisocyanates for the production of coatings having good mechanical qualities.

However, disadvantages of these coatings include their somewhat unsatisfactory weathering properties and the often inadequate resistance to organic solvents and aqueous bases. Thus, for example, finishing lacquer coatings for automobiles which are based on the above hydroxyl group-containing polymers, more particularly metal-effect multilayered lacquer coatings, the final covering layer of which contains metal pigments, often have only insufficient resistance to UV-light, which, in very sunny areas, can result in the formation of cracks. When these are clear lacquers based on the above polymers, they have a tendency to matt under the effects of weathering, thereby making unsightly the metal-effect lacquer coatings which have clear lacquers of this type as finishing lacquer.

Thus, an object of the present invention is to provide new binders which combine the advantages of known hydroxyl group-containing polymer resins without suffering the disadvantages thereof, that is to say binders which are particularly suitable for the production of weather and chemical-resistant coatings.

This object is achieved by providing the polymer resins according to the present invention, described in more detail in the following.

SUMMARY OF THE INVENTION

The present invention is directed to cross-linkable, hydroxyl group-containing polymer resins which are obtained by copolymerizing olefinically-unsaturated monomers and are suitable as binder components for lacquers, the polymer resins having a hydroxyl number of about 20 to 400, an average osmometrically-determined molecular weight of about 500 to 30,000 and a molecular inhomogeneity U of about 0.5 to 15, characterized in that they contain about 0.2 to 80% by weight, preferably about 10 to 70% by weight, based on the total weight of the copolymers, of incorporated monomers selected from olefinically- and acetylenically-unsaturated aliphatic diols having 4 carbon atoms, the ether group-containing alkoxylation products thereof with a hydroxyl number of about 50 to 900, the reaction products of these diols with ε-caprolactone in a mol ratio of diol:ε-caprolactone of about 1:0.2 to 1:10 and any mixtures of these components.

The present invention is also directed to the use of the above polymer resins as binders for coating compositions.

DETAILED DESCRIPTION OF THE INVENTION

The present polymer resins, that is polyacrylate polyols have a hydroxyl number of about 20 to 400, preferably about 35 to 200, an acid number of up to about 100, preferably about 5 to 50, an average osmometrically-determined molecular weight of about 500 to 30,000, preferably about 800 to 8000 and a molecular weight inhomogeneity U of about 0.5 to 40, preferably about 0.5 to 20. The molecular inhomogeneity U is defined by the equation:

$$U = (M_w/M_n) - 1$$

$M_w$ representing the weight average molecular weight and $M_n$ representing the numerical average molecular weight.

The polymer resins are copolymers of olefinically-unsaturated monomers which are conventionally used for the production of resins of this type such as (meth)acrylic acid, the simple (optionally hydroxyl-substituted) esters of these acids such as methyl(meth) acrylate, ethyl(meth)acrylate, n- or iso-propyl(meth) acrylate, the isomeric butyl(meth)acrylates, 2-ethylhexyl(meth)acrylate, 2-hydroxyethyl(meth)acrylate, 2-hydroxypropyl(meth)acrylate, 4-hydroxy butyl(meth)acrylate, maleic acid, monoesters of maleic acid with alcohols having up to 8 carbon atoms, itaconic acid and fumaric acid, styrene, vinyltoluene, vinylacetate or any mixtures of olefinically-unsaturated monomers of this type. However, this list of suitable monomers which is given by way of example is not intended to restrict the monomers which are suitable in principle.

It is essential to the present invention that the polymer resins contain about 0.2 to 80% by weight, preferably about 10 to 70% by weight, based on the total weight of the polymer resins, of incorporated olefinically- or acetylenically-unsaturated C$_4$-diols and/or particular derivatives of these diols in addition to the monomers, given by way of example, which are conventionally used in the production of polymer resins of this type.

The comonomers essential to the present invention include 1,2-dihydroxy-but-3-ene, 1,4-dihydroxy-but-2-ene, 1,4-dihydroxy-but-2-yne, their alkoxylation products, that is the ethoxylation and/or propoxylation products of these diols having an OH number of about 50 to 900 and the reaction products of the above diols with ε-caprolactone in a mol ratio of diol: caprolactone of about 1:0.2 to 1:10, preferably about 1:0.5 to 1:2. The reaction products of 1,4-dihydroxy-but-2-ene with ε-caprolactone in a mol ratio of diol:ε caprolactone of about 1:0.5 to 1:2 are the preferred monomers essential to the present invention.

The polymer resins according to the present invention can be produced by copolymerizing the monomers, given by way of example, by conventional processes. Radical polymerization in the melt or in solution is preferred. Polymerization can be carried out at a temperature of about 50° to 200° C., preferably about 80° to 150° C.

The monomers are essentially incorporated into the copolymer resin in the same ratios used for polymerization, the polymerized units being substantially statistically-distributed.

Suitable initiators for carrying out the present process are those compounds which thermally decompose into radicals during a reaction of the first order. The half-lives of the radical decomposition of suitable initiators should be about 100 to 0.01 minutes at about 80° to 150° C. Examples of initiators of this type are: symmetrical aliphatic azo compounds such as azoisobutyric acid nitrile, azo-bis-2-methylvalerone nitrile, 1,1′-azo-bis-1-cyclohexane nitrile and 2,2′-azo-bis-isobutyric acid alkyl ester; symmetrical diacyl peroxides such as acetyl-, propionyl- or butyryl peroxide, benzoyl peroxides which are substituted by bromo, nitro, methyl or methoxyl groups and lauroyl peroxide; symmetrical peroxydicarbonates such as diethyl-, diisopropyl-, dicyclohexyl- and dibenzoylperoxide carbonate: tert.-butyl peroctoate or tert. butylphenyl peracetate; and peroxy carbamates such as tert.-butyl-N-phenolperoxy) carbamate or tert. butyl-N-(2-, 3- or 4-chloro-phenylperoxy)-carbamate. The following are also suitable: tert.-butyl hydroperoxide, di-tert.-butyl-peroxide, cumene hydroperoxide and dicumylperoxide.

The initiators are generally used in a quantity of about 0.2 to 15% by weight, based on the total quantity of monomers.

Conventional modifiers can also generally be used in a quantity of about 0.1 to 10% by weight, based on the total quantity of monomers, for the production of the present polymer resins. The following are examples of suitable modifiers: mercaptoethanol, 1-mercapto-3-hydroxy-propane, 1-mercapto-4-hydroxybutane, tert.-dodecylmercaptan or n-dodecylmercaptan. If polymerization is carried out in solution, inert solvents such as ethanol, propanol, isopropanol, N- or iso-butanol, methyl ethyl ketone, toluene, xylene, acetic acid butylester or butyl glycol can also be used. The present polymer resins can also be produced according to the known principle of emulsion polymerization.

It is also possible in principle to carry out the polymerization reaction in the presence of so-called reactive diluents. These are mainly polyhydric alcohols having a molecular weight of 62 to about 6000, preferably 62 to about 400, which are present in admixture with the polymer resins on completion of the polymerization reaction. These liquid mixtures can then be directly used as binding components in, for example, two-component polyurethane lacquers. The following are examples of suitable reaction diluents: low molecular weight polyols such as ethylene glycol, propylene glycol, butylene glycol, 1,6-dihydroxyhexane, trimethylol propane, diethylene glycol, triethylene glycol, dipropylene glycol and/or tripropylene glycol or relatively high molecular weight polyols of the type known from polyurethane chemistry such as polyester polyols based on the above simple alcohols and conventional polybasic carboxylic acids including adipic acid, phthalic acid, tetrahydrophthalic acid or hexahydrophthalic acid or relatively high molecular weight polyether polyols obtained by alkoxylating in known manner the above simple ether group-free polyols with ethylene oxide and/or propylene oxide.

It is also possible in principle to modify the present polymer resins subsequent to the production thereof by reacting them, for example, with epoxides such as glycidol or glycidol esters: carboxylic acid anhydrides such as phthalic acid anhydride; and carboxylic acids such as benzoic acid, ethyl caproic acid, fatty acids or oleic acids, in order to improve thereby specific properties of the polyols such as the colorant-acceptance, or properties of the coatings which are eventually obtained, such as their adhesion and alkali-resistance. However, a modification of this nature of the present polymer resins is generally unnecessary and consequently less preferred.

The present polymer resins can be freed from volatile constituents at elevated temperature, i.e. about 140° to 200° C., subsequent to their production and after optional modification. This can, for example, take place either under ambient pressure in coil evaporators by blowing an inert gas such as nitrogen, or under vacuum in evaporating apparatus such as falling film evaporators, thin layer evaporators, screw-flights evaporators, flask evaporators or spray evaporators.

The present polymer resins are valuable binders for two-component lacquers. The term "two-component lacquers" is to be understood in this context as designating both "single-pot systems" and "two-pot systems." The fact that the present polymer resins are binders for two-component lacquers merely means that there has to be a hardening component in the lacquers in addition to the present polymer resins (and optionally further polyhydroxyl compounds). If this hardener is, for example, a polyisocyanate with free isocyanate groups, the ready-for-use coating agents can only be produced shortly before the processing thereof by mixing the components. This type of case would be a "two-pot system". If, however, the hardener is a compound which reacts with the present polymer resins only at elevated temperatures, such as polyisocyanates with blocked isocyanate groups, the hardener can be combined with the polymer resin at room temperature to produce a "single-pot system" which is storable at room temperature.

According to the present invention the polymer resins, can be used in admixture with up to about 90% by weight, preferably up to to about 40% by weight, based on the total mixture, of other compounds having active hydrogen atoms. This includes the "reactive diluents" previously mentioned by way of example, i.e. the polyhydroxyl compounds which are present during the production of the polymer resins or are subsequently mixed with the polymer resins, but this should be qualified by indicating that the mixtures should have a maximum content of the low molecular weight polyols mentioned by way of example of up to 35 OH-equivalent %. Oil modified-alkyd resins or urethane-modified polyester polyols, for example, can be used as admixing components in addition to the above relatively high molecular weight polyhydroxyl compounds previously mentioned. Suitable hydroxyl group-containing admixing components for the present polymer resins, more particularly those components based on polyester are, for example, described in the following relevant standard works such as 1. Temple C. Pattan, Alkyd Resin Technology, Interscience Publishers, John Wiley & Sons, New York, London 1962;
2. Dr. Johannes Scheiber, Chemie und Technologie der kunstlichen Harze, Wissenschaftliche Verlagsgesellschaft mbH, Stuttgart, 1943;
3. Hans Wagner und Hans-Friedrich Sarx, Lackkunstharze, 4th Edition, Karl Hanser Verlag, Munich 1959;

4. Ullmanns Encyclopädie der technischen Chemie, Vol. 14, pages 80 to 106 (1963).

If the present polymer resins are produced, as mentioned above, in the presence of polyester polyols as reaction medium, it is possible when using weak solvents in the production of the polymer resins (for example white spirit and/or aromatic hydrocarbon solvents which represent a solvent for the polyester polyol, but a non-solvent for the polyhydroxyl polyacrylate) to obtain the polyhydroxyl polyacrylate in the form of a dispersion of polymer microparticles which are dispersed in a stable manner in the polyester polyol or in a solution thereof. The use of dispersions of this type is possible in the present process in particular if the lacquers are hardened to completion under the effects of heat. In this case the dispersed polyhydroxyl polyacrylate particles melt before being cross-linked with simultaneous homogeneous distribution in the lacquer film with the result that clear lacquer layers are also obtained in this case.

As explained above, the present polymer resins are binders which have to be cross-linked by means of a cross-linking agent. The cross-linking agents which are most particularly preferred include the known lacquer polyisocyanates having aliphatically- and/or cycloaliphatically-bound isocyanate groups, in particular those groups which are based on 1,6-diisocyanatohexane and/or based on 1-isocyanato-3,3,5-trimethyl-5-isocyanatomethylcyclohexane (isophorone diisocyanate). Particularly preferred cross-linking agents are (i) isocyanurate group-containing polyisocyanates based on the above diisocyanates or mixtures thereof, (ii) biuret group-containing polyisocyanates based on 1,6-diisocyanato-hexane, (iii) mixtures of the polyisocyanates mentioned in (i) and (ii), and (iv) blocked polyisocyanates of the type mentioned in (i)–(iii). The biuret group-containing lacquer polyisocyanates can, for example, be produced according to the processes described in U.S. Pat. Nos. 3,124,605, 3,358,010, 3,903,126, 3,903,127, 3,976,622. The suitable isocyanurate group-containing polyisocyanates can, for example, be produced according to U.S. Pat. No. 3,919,218 or DE-AS No. 1,954,093. Phenol, ε-caprolactam, malonic acid diethylester or acetylacetic acid ethylester are examples of suitable blocking agents.

Of course other polyisocyanates known from polyurethane chemistry such as 2,4-diisocyanato toluene, 4,4'-diisocyanato-diphenylmethane or 4,4'-diisocyanato-dicyclohexylmethane can also be used in principle according to the present invention. However, the use of polyisocyanates of this type is less preferred than the use of the above-mentioned lacquer polyisocyanates.

Other cross-linking agents can also be used in principle according to the present invention.

Cross-linking agents of this type include aminoplast resins which have been provided with hydroxyl groups by a condensation reaction, for example, melamine derivatives such as hexamethoxy methyl melamine or other melamine-formaldehyde condensation products, as described by way of example in FR-PS No. 943,411 and by D. H. Salomon in "The Chemistry of Organic Filmformers" pages 235–240, John Wiley & Sons, Inc., New York, 1974.

Other cross-linking agents which can be used in principle, but which are less preferred than the polyisocyanates, melamine resins, and in particular the lacquer polyisocyanates with free isocyanate groups which are particularly preferred, are the epoxide group-containing compounds equipped with alcoholic hydroxyl groups within the context of an addition or condensation reaction, phenoplast resins, resol resins, urea resins or guanidine resins. Any mixtures of these cross-linking agents, given by way of example, can also be used.

When the present polymer resins or the admixtures thereof with further compounds having alcoholic hydroxyl groups are used according to the present invention the cross-linking agents are generally used in a quantity such that there are about 0.8 to 2.5, preferably about 0.9 to 1.5 reactive groups of the cross-linking agent for every alcoholic hydroxyl group.

Conventional auxiliaries and additives known from lacquering technology can of course also be used according to the present invention.

The auxiliaries include solvents such as methanol, ethanol, isopropanol, acetic acid ethylester, acetic acid butylester, ethyl glycol acetate, ethylene glycol monoethylether, methyl ethyl ketone, methyl isobutyl ketone, cyclohexanone, toluene, xylene, white spirit or mixtures of such solvents. Solvents having isocyanate-reactive groups are preferably not used if there are free isocyanate groups present unless they are used as "reactive diluents" and not as inert solvents.

Further auxiliaries and additives include pigments, viscosity-regulating materials, anti-foaming agents, catalysts for the NCO/OH addition reaction, UV-absorbers or anti-oxidants.

According to one particular embodiment of the use according to the present invention, the present polymer resins can be used in water-soluble or -dispersible form in aqueous or aqueous-organic coating agents. To this end, the carboxyl groups present in the polymer resins are converted into carboxylate groups by partial or complete neutralization. Of course to this end the polymer resins must have a minimum carboxyl group content of about 1.5 to 15% by weight of carboxyl groups. The polymer resins are water-soluble or -dispersible with a carboxylate group content of about 1.5 to 15% by weight. Suitable neutralizing agents include ammonia, methyl amine, ethyl amine, diethyl amine, triethyl amine, mono-, di-or triethanol amine, N-methyl-diethanol amine, dimethyl ethanol amine or comparable basic compounds.

Neutralization can take place in the absence or in the presence of the solvents given above by way of example, preferably in the presence of water-compatible solvents and optionally in the presence of cross-linking agents which do not react at room temperature with active hydrogen atoms and/or in the presence of the above-mentioned examples of auxiliaries and additives. Cross-linking agents which are also water-soluble or -dispersible are preferably used when the carboxylate group-containing polymer resins are used in aqueous or organic-aqueous coating agents. However, it is enough in certain cases for the polymer resins alone to have sufficient water-solubility or -dispersibility so that they can then assume the functions of an emulsifier for the cross-linking agents which are not water-soluble or -dispersible.

It is also possible in principle, though not preferred, to modify cationically the present polymer resins by, for example, the incorporation of tert. amine nitrogen atoms which can be converted into ammonium groups subsequent to the production of the polymer resins, with the result that cataphoretically-separable binders can be produced.

The coating agents used according to the present invention can be hardened to completion at a temperature of about 0° to 250° C., depending on the type of cross-linking agent used. Coating agents used according to the present invention which have isocyanate group-containing compounds as cross-linking agents can be hardened to completion at room temperature. Systems of this type are preferably hardened to completion at a temperature of about 0° to 150° C., preferably from room temperature to 130° C. Stoving lacquers used according to the present invention and which contain polyisocyanates with blocked isocyanate groups or melamine resins, for example, as cross-linking agents are generally hardened to completion at a temperature of about 60° to 250° C. It is often advantageous at this juncture to commence hardening at a temperature below 120° C. and to bring it to completion at a temperature above 120° C.

After hardening, the coating agents produced by using the polymer resins according to the invention as binder components produce coatings having excellent properties from an applicational point of view and very good chemical- and weathering-resistance. Household equipment with metallic surfaces, such as dishwashers, washing machines and refrigerators in particular, can be lacquered with the aqueous stoving lacquers obtained from the present binders to provide coatings having particularly good resistance to detergents and solvents, full gloss and excellent surface hardness.

On the other hand, on account of the full gloss and the excellent behavior under the effects of weathering, these binders are particularly suitable for coating objects which are subjected to the effects of weather. In addition to cladding panels, these also include all types of transport vehicles, more particularly cars, railway carriages, aircraft, containers and ships.

The lacquers are applied by conventional methods of lacquer technology, for example, by injection, casting, immersion or rolling. The lacquers are generally applied in a quantity such that the clear lacquers have a dry film coverage of about 0.005 to 0.05 mm.

In the production of two-layer metal effect lacquer coatings using the present polymer resins as binder components, the present lacquers are preferably used as clear lacquers for the production of a final layer in multi-layered lacquering, the previous layer containing metal pigments. In order to produce a metal effect lacquer coating on a motor vehicle, generally the bodywork is initially anodically- or cathodically-coated with an electrodeposition base. After this layer has been stoved and optionally smoothed a filler is applied which after stoving forms the substrate or the base onto which metal effect lacquer coating is applied. A base lacquer containing the metal pigment is then applied to the surface of the filler, the binder of which base lacquer can also contain the present polymer resins as polyhydroxyl component. If the present polymer resins are used as binder components in the clear lacquer which is applied to this base lacquer a mutlilayered lacquer coating is produced which has an exceptionally hard scratch-resistant and highly-elastic surface which has very good resistance to the effects of weathering and chemicals.

The following Examples serve to further explain the present invention. All percentages relate to percent by weight, and all "parts" relate to parts by weight unless otherwise specified.

EXAMPLES

EXAMPLE 1

2880 parts xylene and 3720 parts butyl acetate were placed in a glass vessel provided with a reflux cooler and heating, cooling and metering apparatus and heated to 140° C. A mixture of 3143 parts of a reaction product of 1 mol 1,4-dihydroxy-but-2-ene with 2 mols ε-caprolactone (viscosity 130 mPa.s at 25° C., OH number=332 mg KOH/g substance, acid number<0.8 mg KOH/g substance), 1002 parts 2-ethylhexyl acrylate, 75 parts acrylic acid and 3235 parts methyl methacrylate were metered at 140° C. over the course of 4 hours under a nitrogen atmosphere.

105 parts di-tert.-butyl peroxide in 840 parts xylene were simultaneously added separately over a period of 5 hours.

The mixture was then held for 3 hours at 140° C. and pressed through a filter after cooling.

A solution of a polymer resin according to the present invention was obtained which had a solids content of 49.6% and a viscosity of 1331 mPa.s at 20° C. The solids material had an acid number of 10 mg KOH/g and a hydroxyl number of 152 mg KOH/g.

EXAMPLE 2

Example 1 was repeated with the difference that the monomer composition was a mixture of 1026 parts of a reaction product of 1 mol 1,4-dihydroxy-but-2-ene with 1 mol ε-caprolactone (viscosity 80 mPa.s at 25° C., OH number=544 mg KOH/g substance, acid number<0.6 mg KOH/g substance), 2051 parts 2-ethylhexyl acrylate, 75 parts acrylic acid and 4237 parts methyl methacrylate.

A solution of a polymer resin according to the present invention was obtained which had a solids content of 50.2% and a viscosity of 1459 mPa.s at 20° C. The solids material had an acid number of 12 and a hydroxyl number of 148.

COMPARATIVE EXAMPLE

Example 2 was repeated with the difference that the 1,4-dihydroxy-but-2-ene/ε-caprolactone proportion was substituted in an equimolar manner by 2-hydroxypropyl acrylate.

A solution of a copolymer was obtained which had a solids content of 49.8% and a viscosity of 1280 mPa.s at 20° C. The solids material had an acid number of 10.7 and a hydroxyl number of 142.

EXAMPLE 3

Example 1 was repeated with the difference that the monomer composition was a mixture of 2915 parts butyl acrylate, 4715 parts methyl methacrylate, 55 parts acrylic acid and 1040 parts ethoxylated 1,4-dihydroxy-but-2-ene having an average 2 mols ethylene oxide per mol diol.

A mixture of 295 parts di-tert.-butyl peroxide in 830 parts xylene was used as initiator solution.

A solution of a polymer resin according to the present invention was obtained which had a solids content of 50.0% and a viscosity of 1381 mPa.s at 20° C. The solids material had an acid number of 7 and a hydroxyl number of 70.

EXAMPLE 4

Example 3 was repeated with the difference that the monomer composition was a mixture of 4835 parts styrene, 3120 parts butyl acrylate, 205 parts methyl methacrylate, 55 parts acrylic acid and 520 parts 1,4-dihydroxy-but-2-ene.

A solution of a polymer resin according to the present invention was obtained which had a solids content of 50.4% and a viscosity of 1087 mPa.s. The solids material had an acid number of 5 and a hydroxyl number of 81.

Use of the polymer resins as binder components

In each case 100 parts of the 50% resin solutions were weighed in and in each case processed to produce a lacquer with the addition of 4.5 parts of a of a commercial flow agent ( ®Baysilonöl OL, Bayer AG, 1% solution in ethyl acetate), 32,7 parts of an isocyanurate group-containing polyisocyanate based on hexamethylene diisocyanate having an NCO content of 19.4% by weight (50% solution in xylene), 1.8 parts by weight of zinc octoate (10% Zn metal content) and 0.9 parts by weight of a commercial heat stabilizer ( ®Irganox 1010, Ciba-Geigy, Basel, Switzerland). The clear lacquer was diluted with the addition of 38.9 parts of a solvent mixture of ethylene glycol-monoethylether acetate, butyl acetate and xylene in a weight ratio of 2:1:1.

The clear lacquers produced in this manner were directly used after the production thereof to produce lacquer top coats on metal lacquer coatings in the following manner.

10 test plates were inactivated by iron phosphatization, primed with a conventional electroplating lacquer coating which was stoved and then coated with a conventional stoving filler which was also stoved.

5 of the plates which had been pretreated in this manner were coated with a base lacquer based on acrylate/cellulose acetabutyrate/melamine resins, the 5 remaining plates were coated with a base lacquer based on acrylate resin/isocyanate resins. Both types of base lacquer contained an aluminum pigment. The plates were then coated by injection wet on wet with the clear lacquers which had been adjusted to a processable consistency (from about 20 to 23 s in the discharge beaker with a 4 mm nozzle) using a solvent mixture of xylene/butylacetate/ethyl glycol acetate in a ratio of 1:1:2. After a flash-off period of 15 min, the coating was hardened for 30 min at 80° C. in a circulating furnace. The experiments were carried out such that the layers of clear lacquer had in each case a dry coverage of 35 to 40 μm and such that the complete multilayered lacquer coating had a dry coverage of about 120 μm.

The plates which were coated in this manner were stored for 24 hours in an air-conditioned room at 23° C. with air humidity of 50% and then underwent the following tests.

Weather-O-meter with a carbon arc lamp—effects of prolonged light, alternating effect: 17 min dry, then 3 min spraying, Black plate temperature: maximum 65° C.

The plates were assessed when they began to form cracks.

The test results are compiled in the following Table.

TABLE

| | Clear lacquer according to Example | | | | |
|---|---|---|---|---|---|
| | 1 | 2 | 3 | 4 | Comparison |
| on polyacrylate/cellulose-acetabutyrate-melamine base lacquer Weather-O-meter (carbon arc lamp) | | | | | |
| cracked after hours* | about 3000 | about 2500 | about 3000 | about 3000 | about 1200 |
| Gloss 60° after 1000 hours° | 90 | 85 | 90 | 87 | 70 |
| on polyester/cellulose acetabutyrate-melamine base lacquer Weather-O-meter (carbon arc lamp) | | | | | |
| cracked after hours* | about 3000 | about 2500 | about 3000 | about 3000 | about 1200 |
| Gloss 60° after 100 hours° | 90 | 85 | 90 | 87 | 68 |

*Assessed according to DIN 53 230
°Gloss according to DIN 67 530

EXAMPLE 5

Production of a polymer resin solution 1029 g ethyl glycol were placed in a glass vessel provided with a reflux cooler and heating, cooling and metering devices and heated to 110° C. A mixture of 120 g of the addition product of 1,4-dihydroxy-but-2-ene and ε-caprolactone (mol ratio 1:2), 353 g n-butyl-acrylate, 865 g styrene, 104 g acrylic acid, 282 g N-methoxymethyl acrylic acid amide and 10 g mercapto ethanol were metered in at 100° C. over a period of 3 hours. A mixture of 66 g tert.-butyl peroctoate and 171 g ethyl glycol were simultaneously added dropwise over a period of 4 hours. The mixture was then stirred for 2 hours at 110° C.

After the solid constituents had been filtered off, a solution of a polymer resin according to the present invention was obtained which had a solids content of 59.3% and a viscosity of 12500 mPa.s at 20° C. The solids material had an acid number of 27 and a hydroxyl number of 25.

Production of a white lacquer and a lacquer film produced therefrom 100 parts of the above-described solution of the polymer resin were neutralized with 4.34 parts dimethyl ethanol amine and grinding stock formulations for bead mill grinding were produced from 7.84 parts of the neutralized solution with addition of 27.12 parts titanium dioxide of the native type and 15.46 parts water. The following white lacquer was then prepared from this mixture:

| | in parts |
|---|---|
| Grinding stock formulation | 50.42 |
| Unneutralized polymer resin solution | 34.52 |
| hexamethoxymethyl melamine | 4.54 |
| p-toluene sulphonic acid, 10% in isopropyl alcohol | 0.54 |
| flow agent of example 4 | 0.30 |
| water | 9.68 |
| | 100.00 |

| | in parts |
|---|---|
| Adjustment to injecting viscosity (51 s in a 4 mm-flask, DIN 43,211) with butyl glycol/water 1:1 | 28.5 parts |

The white lacquer obtained was applied by injection to zinc-phosphotized steel plates (dry film coverage about 25 to 30 μm) and stoved for 10 min. at 180° C. in a circulating drying chamber.

Test for resistance to washing liquor

The lacquered test plates (with a film coverage of 30 μm which had been stoved for 10 min. at 180° C. and then stored at room temperature for 3 weeks) were placed for 4 hours at 95° C. in a 0.2% aqueous solution of a standard detergent based on pentasodium tripolyphosphate, sodium-metasilicate, sodium carbonate, oxethylated nonylphenol (10 ethylene oxide units/mol phenol) and cyanuric acid chloride.

After rinsing with cold water, the plates were again subjected for 4 hours to a 3% solution of the above detergent at 95° C.

The lacquered test plates passed this washing liquor test without the formation of any bubbles. The lacquer films have the following properties after the washing liquor test:

| | |
|---|---|
| Gloss according to Gardner, 20° angle (ASTM 523) | 81 |
| Pendulum hardness according to Konig, (sec) DIN 53 157 | 152 |
| Bonding strength (square cut) DIN 53 151 | 1 |
| Erichsen cupping (mm) DIN 53 156 | 3 |
| Yellowing (ELREPHO) | 78.2 |

Although the invention has been described in detail in the foregoing for the purpose of illustration, it is to be understood that such detail is solely for that purposes and that variations can be made therein by those skilled in the art without departing from the spirit and scope of the invention except as it may be limited by the claims.

What is claimed is:

1. A cross-linkable, hydroxyl group-containing polymer resin which is suitable as a lacquer binder and produced by copolymerizing olefinically-unsaturated monomers, said polymer resin having an hydroxyl number of about 20 to 400, an average osmometrically-determined molecular weight of about 500 to 30,000 and a molecular inhomogeneity U of about 0.5 to 40, wherein said polymer resin contains about 0.2 to 80% by weight, based on the weight of said polymer resin, of incorporated monomers selected form the group consisting of olefinically-unsaturated aliphatic diols having 4 carbon atoms; acetylenically-unsaturated aliphatic diols having 4 carbon atoms; the ether group-containing alkoxylation products of said olefinically-unsaturated aliphatic diols having 4 carbon atoms, said ether groups-containing alkoxylation products having a hydroxyl number of about 50 to 900; the ether group-containing alkoxylation products of said acetylenically-unsaturated aliphatic diols having 4 carbon atoms, said ether group-containing alkoxylation products having a hydroxyl number of about 50 to 900; the reaction products of said olefinically-unsaturated aliphatic diols having 4 carbon atoms with ε-caprolactone in a mole ratio of said olefinically-unsaturated aliphatic diols having 4 carbon atoms to ε-caprolactone of about 1:0.2 to 1:10; the reaction products of said acetylenically-unsaturated aliphatic diols having 4 carbon atoms with ε-caprolactone in a mole ratio of said acetylenically-unsaturated aliphatic diols having 4 carbon atoms to ε-caprolactone of about 1:0.2 to 1:10; and mixtures thereof.

2. The polymer resin of claim 1, which comprises about 10 to 70% by weight, based on the weight of said polymer resin, of incorporated reaction products of 1,4-dihydroxy-but-2-ene with ε-caprolactone in a mol ratio of about 1:0.5 to 1:2.

3. The polymer resin of claim 1 wherein said incorporated monomer is selected from the group consisting of olefinically unsaturated aliphatic diols having 4 carbon atoms; the ether group-containing alkoxylation products of said olefinically unsaturated diols having 4 carbon atoms, the ether group-containing alkoxylation products having a hydroxyl number of about 50 to 900; the reaction products of said olefinically-unsaturated aliphatic diols having 4 carbon atoms with ε-caprolactone in a mole ratio of olefinically unsaturated aliphatic diols having 4 carbon atoms to ε-caprolactone of about 1:0.2 to 1:10, and mixtures thereof.

* * * * *